(12) United States Patent
Derrick

(10) Patent No.: US 6,217,067 B1
(45) Date of Patent: Apr. 17, 2001

(54) FLAME PROTECTION FOR A GAS BAG

(75) Inventor: John-Oliver Derrick, Hettstadt (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 0 days.

(21) Appl. No.: 09/229,712

(22) Filed: Jan. 13, 1999

(30) Foreign Application Priority Data

Jan. 13, 1998 (DE) .............................. 298 00 444

(51) Int. Cl.$^7$ .................................................. B60R 21/26
(52) U.S. Cl. ...................................... 280/742; 280/743.1
(58) Field of Search .............................. 280/740, 742, 280/728.1, 729, 743.1, 743.2

(56) References Cited

U.S. PATENT DOCUMENTS

| | | | |
|---|---|---|---|
| 3,473,824 | * 10/1969 | Carey et al. | 280/729 |
| 3,552,770 | * 1/1971 | Berryman | 280/740 |
| 3,836,169 | * 9/1974 | Schiesterl | 280/740 |
| 3,900,210 | * 8/1975 | Lohr et al. | 280/729 |
| 4,830,401 | * 5/1989 | Honda | 280/743.1 |
| 5,249,824 | * 10/1993 | Swann et al. | 280/729 |
| 5,466,003 | * 11/1995 | Tanaka et al. | 280/743.1 |
| 5,573,270 | * 11/1996 | Sogi et al. | 280/740 |
| 5,775,724 | * 7/1998 | Tonooka et al. | 280/740 |
| 5,848,805 | * 12/1998 | Sogi et al. | 280/742 |
| 5,860,672 | * 1/1999 | Peterson | 280/740 |
| 5,992,874 | * 11/1999 | Sugiyama et al. | 280/740 |

FOREIGN PATENT DOCUMENTS

| | | | |
|---|---|---|---|
| 485605 | * 5/1992 | (EP) | 280/743.1 |
| 1-311930 | * 12/1989 | (JP) | 280/729 |
| 3-292237 | * 12/1991 | (JP) | 280/743.2 |

* cited by examiner

Primary Examiner—Peter C. English
(74) Attorney, Agent, or Firm—Tarolli, Sundheim, Covell, Tummino & Szabo L.L.P.

(57) ABSTRACT

An air bag module includes a gas bag with an inlet opening, an inflator having a pyrotechnic propellant and a flame protection. To provide an effective flame protection which is simply and cost-efficiently achievable and applicable to the various methods of folding the gas bag, the flame protection consists of a pot-shaped textile part of a heat-proof material, the bottom of which comprises a central recess corresponding to the inlet opening of the gas bag, and the rim of the central recess surrounds the inlet opening.

4 Claims, 1 Drawing Sheet

FLAME PROTECTION FOR A GAS BAG

FIELD OF THE INVENTION

The invention relates to an air bag module including a gas bag with an inlet opening, an inflator having a pyrotechnic propellant, and a flame protection.

BACKGROUND OF THE INVENTION

In igniting pyrotechnic propellants for explosively inflating a gas bag, gaseous combustion products materialize having very high temperatures which the material of the gas bag, consisting of a synthetic textile fabric, is unable to withstand. Accordingly, various proposals have already been made as to how gas bags of air bag modules may be configured and arranged so that they cannot be damaged or even destroyed by the hot combustion gases. Such means are termed "flame protection" and extend from sieve-type retaining systems intended to prevent the exit of hot solid particles from the inflator, via localized material doubling in the endangered region up to impregnating the gas bag all over with a heatproof material.

Where localized material doubling is proposed it cannot be assured that the regions of the gas bag first impacted by the hot combustion products are also reliably covered since the protective material may become displaced when being folding in place if it is not connected to the gas bag material. When the material is connected to the gas bag, however, difficulties are experienced in folding in place since the connected material doubling is automatically stiffer than the remaining gas bag material and may in turn result in irregularities when being folding in place so that unprotected material may lie in the region of the primary inflow of hot combustion products. In addition to this the means proposed for flame protection are often very complicated and costly.

SUMMARY OF THE INVENTION

It is thus the object to provide in an air bag module of the aforementioned kind an effective flame protection which is simply and cost-effectively achievable, applicable to the various methods of folding the gas bag, and which reliably prevents hot combustion gases from impacting the material of the gas bag before they have appreciable expanded and thus have had time to cool down.

To achieve this object it is proposed in accordance with the invention that the flame protection consists of a pot-shaped textile part of a heatproof material, the bottom of which comprises a central recess corresponding to the inlet opening of the gas bag, the rim of the central recess surrounding said inlet opening.

In a further development of the invention, a mounting plate is provided, the rim of said inlet opening surrounds said inflator and is clamped in place between said inflator and said mounting plate, and said rim of said central recess of said pot-shaped textile part together with said gas bag is clamped in place between said mounting plate and said inflator.

BRIEF DESCRIPTION OF THE DRAWINGS

Advantageous aspects of the gist of the invention read from the subclaims. Further details will now be explained on the basis of the example embodiment as shown in FIGS. 1 and 2 in which:

DESCRIPTION OF THE PREFERRED EMBODIMENT

Figure 1:
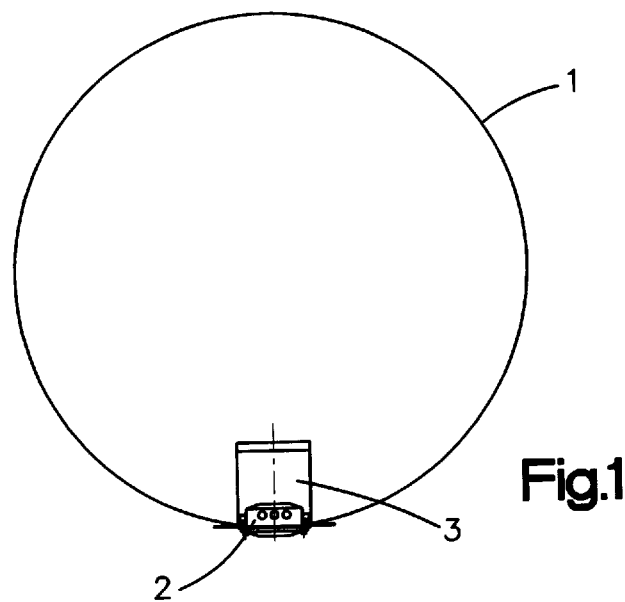
FIG. 1 is a schematic illustration of an inflated gas bag in accordance with the invention.

Referring now to FIG. 1 there is illustrated a spherically inflated gas bag 1 including an inflator 2 and a flame protection 3, gas bag 1 and flame protection 3 being shown in section. In accordance with the invention the flame protection 3 consists of a pot-shaped textile part of a heatproof material by means of which the hot combustion gases emerging from the inflator 2 substantially perpendicularly to the centerline of the air bag module are deflected and concentrated into a flow guided at least initially parallel to the centerline of the gas bag. In this way it is achieved that the hot combustion gases are reliably kept away from the material of the gas bag 1 as long as they have not expanded at least to a certain degree and thus cooled down.

Figure 2:
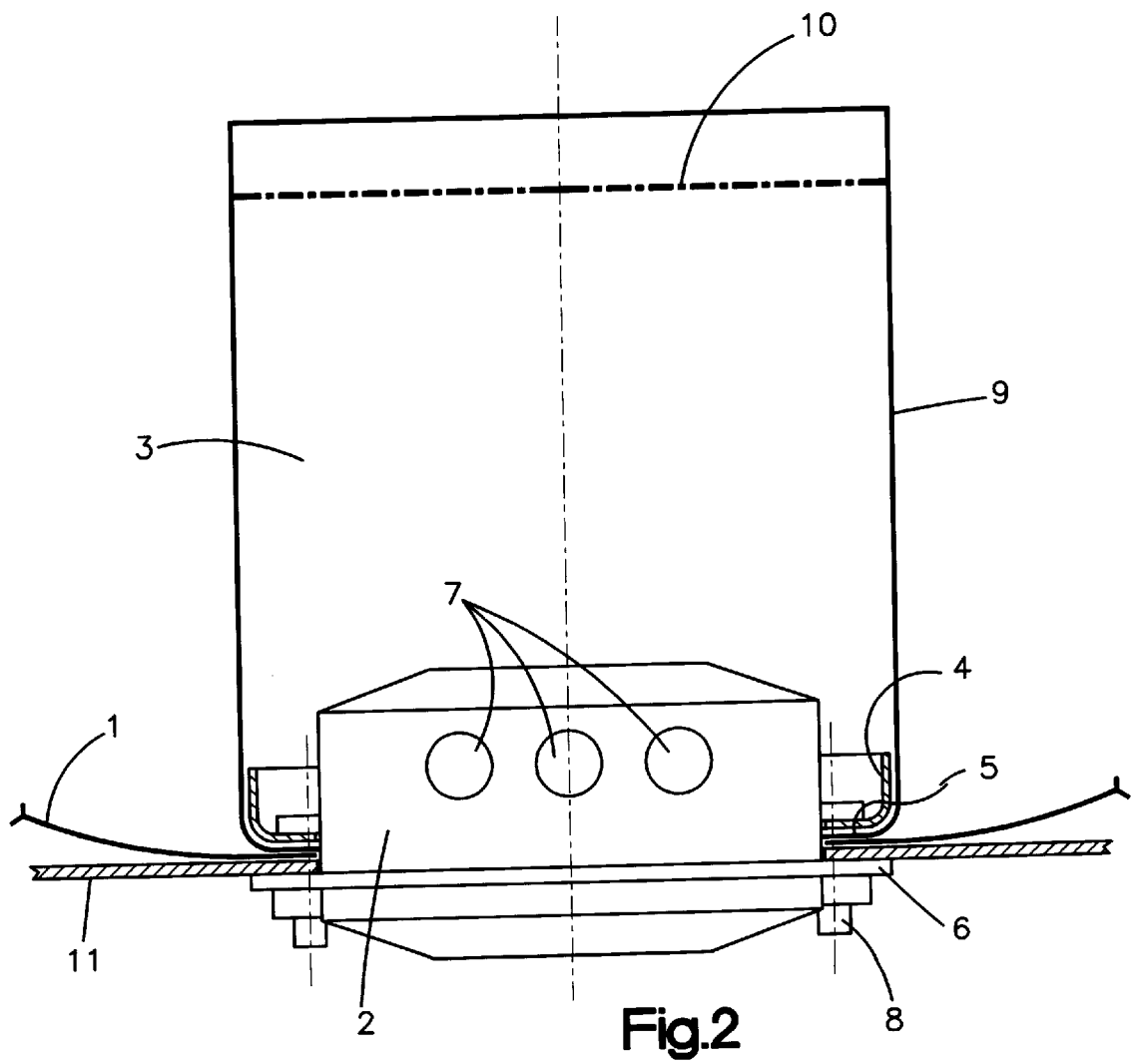
FIG. 2 is a detail shown greatly magnified taken from FIG. 1.

Referring now to FIG. 2 there is illustrated how the gas bag 1 and the bottom 5 of the pot-shaped textile part 3 are clamped in place edgewise between the mounting plate 4 and a surrounding flange 6 of the inflator, whereby screws 8 may simultaneously serve to secure the air bag module in a housing 11 or the like.

The pot-shaped textile part 3 is designed and clamped in place such that its cylindrical wall 9, on inflation of the gas bag, extends concentrically to the centerline of the inflator radially spaced away from the outlet openings 7 thereof to thus ensure that the emerging hot combustion gases are not able to come into contact with the material of gas bag 1 until they have expanded to the volume of the pot-shaped textile part 3. A further improvement may be achieved by the non-clamped pot rim of the pot-shaped textile part 3, which lies opposite to the bottom 5, being doubled and the doubled portions connected to each other by means of a seam 10 which bursts on inflation of the gas bag 1, as a result of which the hot combustion gases remain trapped in the pot-shaped textile part 3 until its internal pressure is sufficient to burst the seam 10. It requires no further explanation to understand that the expansion response of the gas bag may be influenced by correspondingly defining the burst strength of the seam 10.

The flame protection configured in accordance with the invention may be simply clamped in place together with the gas bag. Consequently, no additional means are necessary for the arrangement and securement thereof within the gas bag. More particularly, there is no need to connect the flame protection any further with the material of the gas bag, thus eliminating the difficulties posed when folding it into place, as mentioned at the outset. Accordingly, an effective and reliable protection of the gas bag material against the hot combustion products is provided.

What is claimed is:

1. An air bag module comprising:
   an inflatable gas bag including a rim defining an inlet opening,
   an inflator having a pyrotechnic propellant for, when actuated, inflating said gas bag,
   a flame protection member having a cylindrical wall of a heatproof flexible textile material and a bottom part having a rim defining a central opening corresponding to said inlet opening of said gas bag,
   said gas bag and said inflator having a common central axis,
   said inflator including a cylindrical wall having outlet openings oriented radially with respect to said central axis,
   said inflator being surrounded by the inlet opening of the gas bag and by the central opening in the bottom part of said flame protection member, said cylindrical wall of said flame protection member extending substantially parallel to said axis, said cylindrical wall deflecting a flow of combustion gas from said outlet openings into a flow parallel to said axis upon inflation of said gas bag.

2. The air bag module as set forth in claim 1 further comprising:

a mounting plate, and a flange radially projecting from the inflator wall, said rim defining the inlet opening of the gas bag and said rim defining the central opening in the bottom part of the flame protection member being clamped in place between said mounting plate and the flange of said inflator.

3. The air bag module as set forth in claim 1, wherein said flame protection member includes a rim at an end opposite to said bottom part and wherein portions of said rim are placed on each other and are connected to each other by means of a seam which bursts on inflation of said gas bag.

4. The air bag module as set forth in claim 3, wherein said rim at said end opposite to said bottom part of said cylindrical wall of said flame protection member is not connected to said gas bag.

* * * * *